April 15, 1930. L. NATHAN 1,754,432
PROCESS AND APPARATUS FOR THE FILTRATION OF BEER WORT FOR
FURTHER TREATMENT, AND FOR THE FILTRATION OF BEER
AND OTHER FOAMING LIQUIDS
Filed Sept. 6, 1927
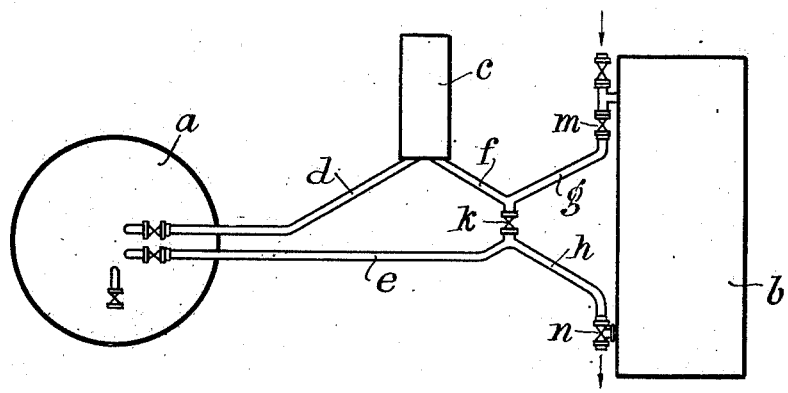
WITNESS
INVENTOR
LEOPOLD NATHAN
BY
ATTORNEYS

Patented Apr. 15, 1930

1,754,432

UNITED STATES PATENT OFFICE

LEOPOLD NATHAN, OF ZURICH, SWITZERLAND, ASSIGNOR TO THE CORPORATION OF HANSENA A.-G., OF GLARUS, SWITZERLAND

PROCESS AND APPARATUS FOR THE FILTRATION OF BEER WORT FOR FURTHER TREATMENT, AND FOR THE FILTRATION OF BEER AND OTHER FOAMING LIQUIDS

Application filed September 6, 1927, Serial No. 217,586, and in Germany September 7, 1926.

This invention relates to the use of so-called suspension filters, in which the filtering medium is deposited, from a state of suspension in a liquid on to a support such as wire nettings as a stratum, which then serves for filtration purposes. This type of filter has not yet been employed in breweries, for which the present invention is primarily intended, and its application to brewing plant presents difficulties and requires certain adaptations necessitated by the special character of beer wort and beer.

In the methods of clarifying wort prior to fermentation, hitherto in use, brewers have been content with removing the coarse impurities, which, in part, settle down spontaneously in the cooler or settling tank, and, in part, are retained by the hop back before the wort enters the fermentation vessel. Several factors have militated against the effecting of a more careful separation of the solid constituents of the wort, for, on the one hand, opinion went so far as to regard any more extensive removal of the particles in suspension as injurious, because they were considered to have a favorable influence on fermentation; and, on the other hand, filtration, with the appliances customary in a brewery, presented difficulties, especially in view of the smeary character of the masses to be eliminated and the large volume of liquid to be transferred to the fermentation vessel in a short time. Further, experiments revealed a certain adverse influence of filtration on the course of fermentation, namely, that the yeast will not float in wort which is perfectly bright, but sinks to the bottom at once and does not rise until later, so that fermentation is more retarded at the outset and is also more prone to come to a standstill later than when a certain proportion of particles is left in suspension. The ordinary filters, employing compressed cakes of cellulose material as the filtering medium, have also the known disadvantages that they must be used over and over again, whilst the impurities which they retain can be eliminated only in part in the intervals, another portion, although sterilized by boiling, remaining and accumulating in the filter cakes until the latter are no longer usable. Finally, considerable pressure is needed in operating the filter, and this pressure brings undesirable substances into solution. Another point, so far as brewing under sterile conditions is concerned, is the practical impossibility of bringing these filters into use in a sterile condition, it being impossible to introduce the filtering medium in such condition, or to sterilize it afterwards.

The present invention is based, primarily, on the recognition of the fact that filtering the wort—especially in brewing under sterile conditions—improves the beer and enables the whole of the brewing process more effectually to be controlled, provided the filtration be performed properly; and that, in particular, substances liable to impair the flavor of the beer are eliminated prior to the fermentation.

The fact that wort contains two different types of impurities is also of substantial importance for the correct performance of filtration. On the one hand are the suspended particles, mainly protein substances, in a state of very fine division, and on the other hand, are greasy substances, containing resins, forming the actual "sludge," which are the cause of special difficulty in filtration, and need to be filtered under different conditions than the fine particles in suspension.

It has now been discovered that the suspension filter, and particularly the so-called flotation filter, is suitable for this filtration. For various reasons, this long-known method has not yet found application in the brewing industry. As is known, the filtering medium in this filter is deposited as a thin layer on a wire sieve of fine mesh, by the movement of the liquid to be filtered or by means of a preceding current of water into which the filtering medium is introduced. The kind of liquid in which the medium is distributed, for the purpose of suspension is not without influence on the character of the filtering layer produced. It has been found, in particular, that filtering layers deposited from water are not so good as those floated-in with wort or beer.

Adding the filtering medium to the wort itself ran counter to the general opinions of brewing experts; only the employment of a sterile substance could be considered, and even this was expected to have an unfavorable influence on the wort. Moreover, it was essential to cause the liquid containing the medium to circulate repeatedly through the filter, in order to obtain a perfect filtering layer, but all such movements of the wort are undesirable. Finally, it was impossible to foretell how these thin layers of filtering medium would behave with regard to the peculiarities of the wort; what thickness of the medium, or what medium, would remain effective, for how long, and under what filter pressure, or how the adhesive masses would behave during deposition from suspension.

The said suspension filter method has also the advantage over the ordinary method in that the intensity of filtration can be controlled accurately. Thus, for example ten different filtering media have been prepared for use with the filter; and these effect well-defined different degrees of filtration. Moreover, filtering media and methods of preparing them are known, in which filtering materials of different degree of grain are arranged in different layers. It is therefore possible to adapt the filtration to the special conditions and requirements of each case.

The invention consists, in the first place, in the employment of the wort or beer itself for floating the filtering medium.

In order to obtain proper flotation it is necessary that the filtering medium should be distributed finely and uniformly in the liquid. Hitherto this was effected by simple stirring or mixing; but it has now been found that this method is not applicable unconditionally, since, not only the beer, but the wort also, froths under such treatment. According to this invention, this can be prevented by effecting the distribution under pressure, the temperature being kept low at the same time.

In filtering beer, it is known to prevent foaming by performing the operation under pressure, in the cold, and providing for counter pressure in the effluent; and these conditions, also, should be maintained in the present instance. One defect of the old method of filtration was that the pressure had to be increased considerably as filtration proceeded, because the filter became clogged with the deposited substances, and a higher pressure became necessary in order to complete the operation with the requisite speed. This is not the case with suspension filters, which can be operated with different and substantially uniform pressure. The increased pressure in filtering beer was also attended with the drawback that it brought into solution substances having an adverse influence on the beer, moreover, sterile filtration was practically impossible, there being no practicable method of introducing the filter cakes into the filter in a sterile condition, and consequently, as regards sterility the cleanliness of the filtration left much to be desired. The cleansing of the used filtering medium was effected by washing or boiling, which, however, eliminated only a few of the filtered impurities, whilst others were left behind in the filter, until, finally, it became so foul that fresh filtering material had to be taken. An advantage of the suspension filter is, that it can be stripped, like a film, from its support after use, and thrown away; and that the deposition of a new film of filtering medium can be effected in a sterile manner.

The following points, in particular, come under consideration in connection with the filtration of wort.

If a wort, which has already been freed from a considerable proportion of the sludge by deposition, is to be filtered, a single passage through a very fine filter will suffice to remove most of the fine particles in suspension. If considerable amounts of sludge are still present, these are removed by a coarse filtering medium, and the fine particles then eliminated by another medium; or the whole can be passed through a composite medium, as described. In this method, the filter pressure may be kept at a substantially uniform level, not exceeding 1 atmosphere, throughout.

It has been found, as a special advantage, that a filtration of this kind may serve as a partial or complete substitute for the cooler or similar appliance, especially when the filtration of the actual sludge and the solid particles in suspension is effected separately. In such an event the wort would be cooled, for example, by a refrigerator, to fermentation temperature, and passed to the fermentation vessel direct. Here the beer is "pitched" with the yeast and kept in agitation until the yeast has grown sufficiently to keep floating without such movement being needed.

To prevent the yeast from subsiding quickly in the filtered wort, the latter is kept in motion during the first stage of fermentation, in known manner, for example by a finely divided current of carbonic acid gas.

Accordingly, this portion of the method consists in introducing the requisite amount of filtering medium into a volume of wort slightly exceeding the cubical capacity of the filter, and forcing this wort repeatedly through the filter until a sufficient degree of limpidity has been attained, after which the entire wort—which may amount to 10–20 times the initial quantity—is forced through. If several layers of filtering medium are to be superimposed, the preliminary operation is repeated with different filtering media.

In order to prevent frothing, the wort and filtering medium must be mixed under pressure, either by introducing the medium into a mixer, which is placed under pressure, and adding the wort under pressure, or else by introducing the wort first and then admitting the filtering medium under pressure. The simplest method of mixing has been found to consist in pumping the liquid and filtering medium repeatedly out of the mixing vessel, through a pipe and back again.

The same remarks apply to the filtration of beer, except that, in this case, it is necessary to take into consideration the special conditions arising from the presence of the carbonic acid gas in the beer and the special character of the suspended impurities in the beer.

The clarification of beer is, in general, a process of deposition, which is completed finally in the maturing cask, or assisted by artificial means (shavings). On this account the filtration of the beer during the operation of racking from the storage cask into trade casks, is of particular importance for top-fermentation beer and running ales. It is, however, practised in the case of all well matured beers, because it happens frequently that, in practice, these are not perfectly bright when they come from the maturing cask. In the early stages of this practice of filtration, foaming was difficult to prevent, and the only method consists in maintaining the conditions of temperature and pressure and by specially arranging the filter.

For various reasons, the suspension filter appears, ab initio, to be particularly unsuitable for the filtration of finished beer; so that no attempt has been made hitherto to apply it for this purpose, nowithstanding the fact that filtration with ready-prepared filter cakes is always regarded in the brewery—for the reasons aforesaid—as an undesirable emergency measure, which is feared by many to impair the flavor of the beer, especially with high filter pressures, and which is capable of introducing fresh infection into the beer. The particles—the result of fermentation—to be eliminated in this case, differ from the particles in suspension in wort so that a different method of filtration has to be employed. The brewer had to expect that the introduction of a filtering medium into the finished beer, for the preparation of a suspension filter, might lead to unforeseeable effects, and extensive foaming in particular.

Experiments have now demonstrated that these difficulties can be overcome with certain kinds of suspension filters, and that a series of new advantages can be obtained, especially in the case of beers which have been brewed under sterile conditions, and beers which are saturated with carbonic acid gas alone and are free from air.

Experiments have shown that beer can be racked, without foaming, under a uniform pressure, which does not need to exceed 1 atmosphere, and corresponding countervailing pressure, provided the temperature be maintained at the customary level of about 1° C., and that the flotation of the filtering medium can be effected by the beer itself without foaming. Adaptation to any type of beer and degree of purity can be effected by the selection of a suitable filter medium from among those known for such suspension filters.

The accompanying drawing illustrates diagrammatically a typical embodiment of a device for mixing and floating the filter medium.

The known mixing device for suspension filters is employed for the operation of flotation by effecting the mixing therein, under pressure, by simply circulating the liquid and the filtering medium (introduced into the mixer) by means of a pump, and by changing the pipe connection, when the mixture has attained the desired uniformity, so that the filter is connected up with the circulation of the liquid, and the pumping is continued, under pressure, until the filtering medium has been deposited completely on the support, wire netting or the like.

$a$ is the mixing vessel, $b$ the filter and $c$ a force pump, these being connected together to form a circulation unit by means of pipes $d, e, f, g, h$, and cocks $k, m, n$. The filtering medium is introduced into the mixer $a$, in any manner, whereupon the cocks $m$ and $n$ are closed, the cock $k$ opened, and the pump $c$ started, so that the liquid and filtering medium are set in circulation through the pipes $d, e, f$ and the mixer $a$ and the pump $c$. When mixing is completed, the cock $k$ is closed and the cocks $m$ and $n$ are opened, and, pumping being continued, the mixture then passes by way of the pipe $d$, mixer $a$, pipes $e$ and $h$, cock $n$, filter $b$, cock $m$, pipes $g$ and $f$, and pump $c$, until the whole of the filtering medium has been deposited and the liquid has become clear. The liquid to be filtered is then pumped—by the same pump if desired—through the filter $b$.

In working with this device, a further advantage with regard to the prevention of foaming, is secured by the exclusion of air. The pressure under which the mixing of the filtering medium with beer should be effected, is higher than the pressure to which the beer was subjected beforehand, whilst wort is run through at ordinary pressure. If, at the beginning of the operation, the liquid were admitted into the mixer filled with air, and then into the filter, also filled with air, this higher pressure would cause the liquid to absorb air. Such air would become disseminated throughout the whole liquid during the circulation treatment, and might give rise to foaming, the carbonic acid gas, in particular, being disengaged readily through the friction with the walls of the pipes. It is advisable, therefore, to fill all the vessels and pipes with water beforehand, this water being then expelled by carbonic acid gas, and the beer admitted into the spaces filled with said gas.

Now what I claim and desire to secure by Letters Patent is the following:

1. The method of forming filtering layers by the flotation method for foaming liquids such as wort and beer, which comprises mixing together under pressure the liquid to be filtered and the filtering medium until a uniform suspension is obtained, forcing such mixture through a filter chamber to deposit a filtering layer therein, and circulating the liquid repeatedly under pressure until the filtering medium has been completely deposited in a substantially uniform layer.

2. The method of forming filtering layers by the flotation method for foaming liquids such as wort and beer, which comprises circulating the liquid to be filtered with the filtering medium under pressure through a closed circuit repeatedly so as to mix the same, forcing such mixture through a filter chamber to deposit a filtering layer therein, and circulating the liquid repeatedly under pressure until the filtering medium has been completely deposited in a substantially uniform layer.

3. A method of filtering wort and beer and similarly foaming liquids which comprises mixing under pressure a portion of the liquid with a filtering medium so as to suspend the latter therein, forcing the mixture containing the suspended filtering medium repeatedly through a filter under pressure so as to deposit the filtering medium thereon, and finally passing the entire liquid through the filter, the liquid being maintained under pressure both in advance of and to the rear of the filter to prevent foaming thereof.

4. Apparatus for filtering liquids, comprising a closed mixing tank out of communication with the atmosphere, a pump, a conduit between the tank and the pump, a return connection between the same, a filter, a conduit between the pump and the filter, a connection between the filter and the tank, and valves located in said latter conduit and connection whereby said filter may be cut out of or placed in the circulation system including the tank and the pump.

5. Apparatus for forming filtering layers for foaming liquids by the flotation method comprising a closed mixing chamber out of communication with the atmosphere, a pump, conduits connecting said pump and chamber, whereby a mixture of the fluid to be filtered and the filtering medium may be circulated through said chamber and thoroughly mixed therein, a filtering chamber, valved conduits connected to the latter chamber and to said first-mentioned conduits whereby said filtering chamber may be cut into the circulating system including the pump and the mixing chamber, and means for maintaining said liquid under pressure to the rear of the filter to prevent foaming of such liquid.

6. The method of filtering foaming liquids such as beer wort and beer, particularly beer brewed under sterile conditions, which comprises adding a filtering medium to a portion of the liquid to be filtered and circulating such portion under pressure so as to suspend the filtering medium uniformly therein, forcing the suspension repeatedly through a filter to deposit thereon a uniform layer of said filtering medium, and then passing the remaining liquid through the filter at approximately constant pressure.

7. The method of filtering foaming liquids such as beer wort and beer, particularly beer brewed under sterile conditions, which comprises adding successively filtering media of different degrees of fineness to a portion of the liquid to be filtered and circulating such portion under pressure so as to suspend the filtering medium uniformly therein, forcing each suspension repeatedly through a filter to deposit thereon a uniform layer of filtering medium, whereby several filtering layers of different degrees of fineness are obtained, and then passing the remaining liquid through the several layers at approximately constant pressure.

8. The method as set forth in claim 6 wherein a sterile liquid and a sterile filtering medium are employed and wherein the filtration is conducted under sterile conditions without access of air.

9. The method as set forth in claim 2, which includes the step of removing substantially all of the air from the passageways traversed by the liquid before circulating the latter through such passageways.

In testimony that I claim the foregoing as my invention, I have signed my name this 12th day of August, 1927.

LEOPOLD NATHAN.